United States Patent [19]
Gliebe

[11] Patent Number: 5,478,199
[45] Date of Patent: Dec. 26, 1995

[54] ACTIVE LOW NOISE FAN ASSEMBLY

[75] Inventor: Philip R. Gliebe, Waynesville, Ohio

[73] Assignee: General Electric Company, Cincinnati, Ohio

[21] Appl. No.: 345,094

[22] Filed: Nov. 28, 1994

[51] Int. Cl.$^6$ .............................. F01D 25/04; G10K 11/16
[52] U.S. Cl. ................ 415/119; 415/118; 381/71
[58] Field of Search ..................... 415/118, 119; 381/71

[56] References Cited

U.S. PATENT DOCUMENTS

| | | |
|---|---|---|
| 4,044,203 | 8/1977 | Swinbanks ........................ 415/119 X |
| 4,421,811 | 12/1983 | Rose et al. ........................ 428/116 |
| 4,452,335 | 6/1984 | Mathews et al. ................... 415/119 |
| 4,589,133 | 5/1986 | Swinbanks .......................... 381/71 |
| 4,637,048 | 1/1987 | Swinbanks .......................... 381/71 |
| 4,689,821 | 8/1987 | Salikuddin et al. . | |
| 4,815,139 | 3/1989 | Eriksson et al. . | |
| 4,934,483 | 6/1990 | Kallergis ............................ 244/1 N |
| 4,947,356 | 8/1990 | Elliott et al. . | |
| 5,146,505 | 9/1992 | Pfaff et al. . | |
| 5,169,288 | 12/1992 | Gliebe et al. ....................... 415/119 X |
| 5,295,641 | 3/1994 | Kaptein . | |
| 5,347,586 | 9/1994 | Hill et al. .......................... 381/71 |
| 5,355,417 | 10/1994 | Burdisso et al. ................... 381/71 X |
| 5,382,134 | 1/1995 | Pla et al. ........................... 415/119 |
| 5,386,689 | 2/1995 | Bozich et al. ...................... 415/119 X |

FOREIGN PATENT DOCUMENTS 2126837  3/1984  United Kingdom .

Primary Examiner—Edward K. Look
Assistant Examiner—Michael S. Lee
Attorney, Agent, or Firm—Andrew C. Hess; Patrick R. Scanlon

[57] ABSTRACT

A gas turbine engine fan assembly includes an equal number of rotor blades and stator vanes spaced axially therefrom. An annular duct surrounds the blades and vanes and has an inlet for receiving air and an outlet for discharging at least a portion of the air upon compression by the blades. The fan duct further includes a passive acoustic liner tuned for attenuating at least one harmonic noise tone generated by the blades, with a fundamental blade passing frequency noise tone being actively attenuated by a plurality of anti-noise sound transmitters disposed in the fan duct.

10 Claims, 2 Drawing Sheets

ACTIVE LOW NOISE FAN ASSEMBLY

The present invention relates generally to gas turbine engines, and, more specifically, to improved fans and compressors thereof having reduced noise.

BACKGROUND OF THE INVENTION

A gas turbine engine such as a turbojet or turbofan engine powering an aircraft from takeoff through flight, approach, and landing produces noise from the air being compressed therein and from the air and combustion gases being discharged therefrom. Fans and compressors include at least one row of a plurality of circumferentially spaced apart rotor blades for compressing air channeled therethrough followed in turn by a row of circumferentially spaced apart stator vanes. The rotor blades rotate about a longitudinal centerline axis of the engine at a rotational speed N and effect a blade passing frequency (BPF) which is the product of the rotational speed N and the number B of rotor blades. Air channeled between the blades and vanes and inside the duct surrounding the blades and vanes generates conventionally known discrete frequency spinning mode tones or noises within the duct.

Spinning mode noise is conventionally known to include rotating pressure fields caused by both rotation of the rotor blades themselves, and by interaction of the rotor blades with adjacent stator vanes. The spinning mode tones are discharged from the engine either upstream through the duct inlet or downstream through the duct outlet, or both and are radiated toward the ground upon takeoff or landing of an aircraft being powered by the engine. The spinning mode tones occur at discrete frequencies including the fundamental blade passing frequency BPF, alternatively referred to herein as the first harmonic, and higher order frequencies including the second, third and higher harmonics.

In order to reduce the spinning mode noises, at takeoff or approach for example, it is known to selectively determine the number of vanes relative to the number of blades, preferentially space the vanes from the blades, and provide noise suppression liners along the inner wall of the duct surrounding the blades and vanes. These solutions decrease the magnitude of the spinning mode noises either at their inception, or after they are generated by being suitably absorbed into the suppression liner. In order to reduce the noise at its source, a conventionally known cut-off parameter, or ratio, is used wherein the values thereof less than 1.0 will effect decay of the noise, and values 1 or greater will effect propagation of the noise through the length of the duct with essentially undiminished intensity which will therefore radiate from the duct into the ambient air and toward the ground resulting in community noise.

In order to ensure the decay of spinning mode noise, it is conventionally known to select the number of fan vanes V to be greater than or equal to twice the product of the number of fan blades B and the blade passing frequency harmonic number (n). For example, to ensure decay of the spinning mode tone associated with the fundamental blade passing frequency BPF, i.e. harmonic number n=1, the number of vanes V should be greater than or equal to twice the number of blades B. And, to ensure decay of the spinning mode tones for the fundamental and second harmonic, the number of vanes V should be greater than or equal to four times the number of blades B.

However, for modern high by-pass turbofan engines requiring a relatively large number of rotor blades, the resulting number of stator vanes can become impractically high. Accordingly, conventional practice is to select the number of stator vanes to cut-off the fundamental spinning mode noise at the fundamental blade passing frequency BPF only.

SUMMARY OF THE INVENTION

A gas turbine engine fan assembly includes an equal number of rotor blades and stator vanes spaced axially therefrom. An annular duct surrounds the blades and vanes and has an inlet for receiving air and an outlet for discharging at least a portion of the air upon compression by the blades. The fan duct further includes a passive acoustic liner tuned for attenuating at least one harmonic noise tone generated by the blades, with a fundamental blade passing frequency noise tone being actively attenuated by a plurality of anti-noise sound transmitters disposed in the fan duct.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
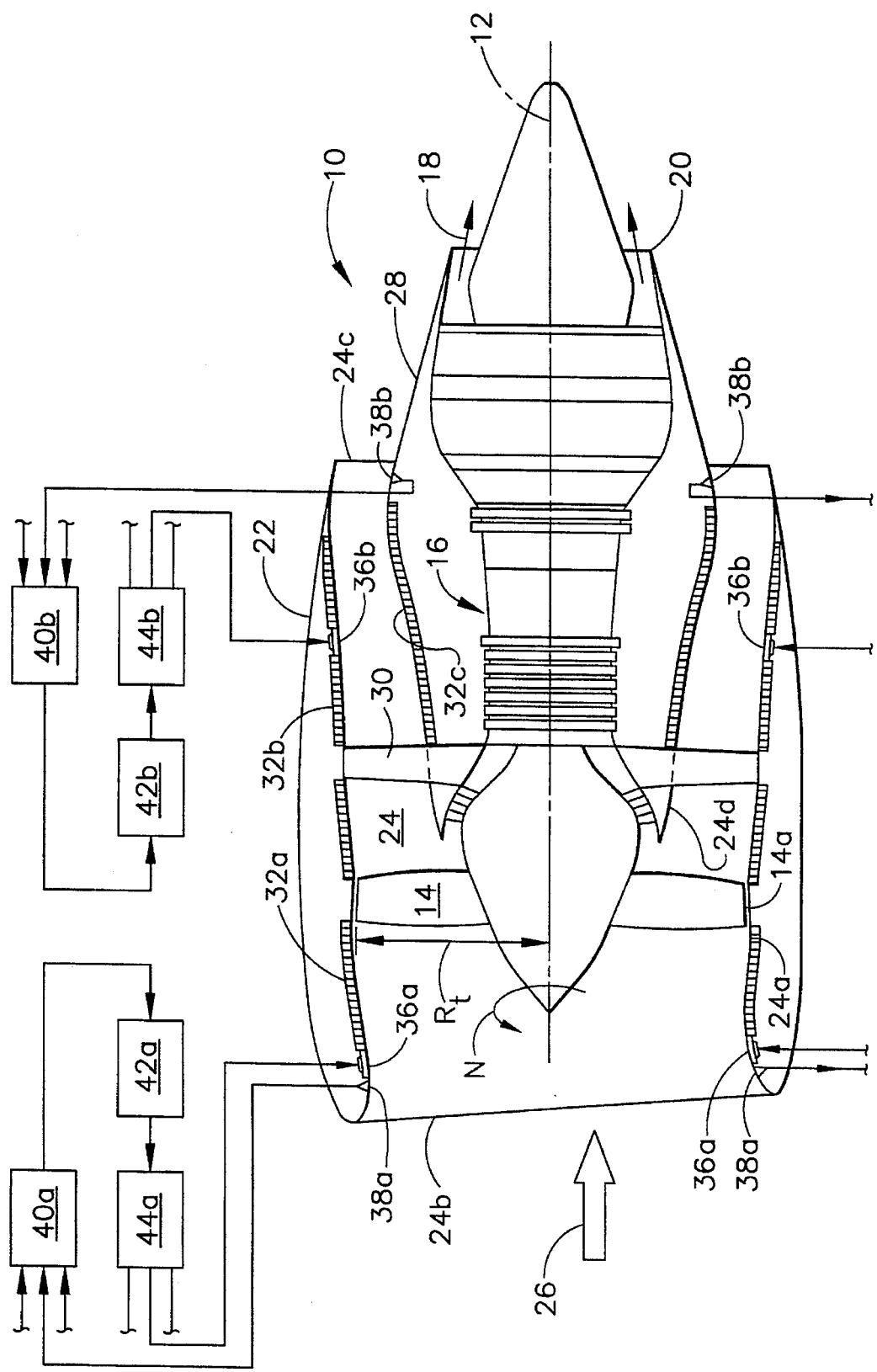
FIG. 1 is a longitudinal partly sectional, schematic representation of an exemplary high bypass turbofan gas turbine engine having a fan assembly in accordance with one embodiment of the present invention.

Illustrated in FIG. 1 is an exemplary gas turbine engine 10, such as a high bypass turbofan engine, effective for powering an aircraft (not shown) in flight from takeoff through cruise, approach, and landing. The engine 10 includes in serial flow communication about a longitudinal centerline axis 12 a fan having a plurality of circumferentially spaced apart fan, or rotor, blades 14, and a conventional core engine 16. The core engine 16 includes low and high pressure compressors followed in turn by a combustor and high and low pressure turbines (not shown) and generates combustion gases 18 for powering the fan blades 14 in a conventionally known manner, with the combustion gases 18 being discharged from an annular exhaust outlet 20 of the core engine 16.

Surrounding the fan blades 14 and the upstream portion of the core engine 16 is a conventional nacelle 22 having an annular fan duct 24 disposed therein through which is channeled ambient air 26 during operation. The fan duct 24 is defined by a radially outer duct wall 24a which extends from a duct inlet 24b at an upstream end thereof to a duct outlet 24c at a downstream end thereof. The fan duct 24 further includes a radially inner duct wall 24d which forms an upstream portion of an annular casing 28 surrounding the core engine 16. The inner duct wall 24d extends from adjacent the trailing edge of the fan blades 14 to the duct outlet 24c which forms an annulus for discharging a radially outer portion of the air 26 compressed by the fan blades 14 during operation to generate thrust. A radially inner portion of the air 26 is channeled into the core engine 16 wherein it is conventionally mixed with fuel and ignited for generating the combustion gases 18.

Figure 2:
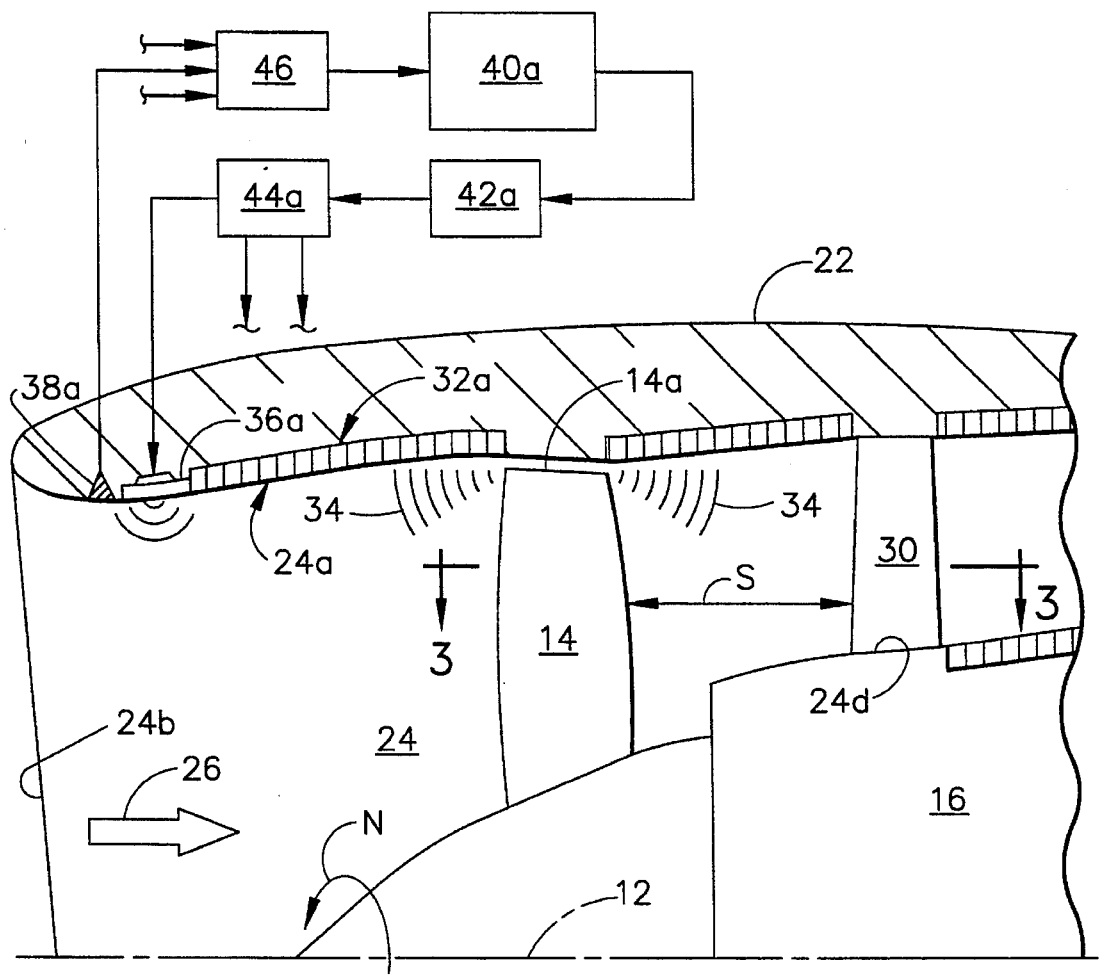
FIG. 2 is an enlarged partly sectional axial view of a portion of the fan assembly illustrated in FIG. 1.

A plurality of circumferentially spaced apart outlet guide vanes (OGVs), or stator vanes 30 extend radially between the outer and inner duct walls 24a,d and are spaced axially downstream from the blades 14 at an axial distance S, as shown in more particularity in FIG. 2. The outer duct wall 24a surrounds both the blades 14 and the vanes 30 and channels the air 26 from the duct inlet 24b downstream to the duct outlet 24c from which it is discharged for providing a majority of the thrust generated by the engine 10 during operation for powering the aircraft.

During operation of the engine 10, the fan blades 14 are caused to rotate at a rotational speed N about the centerline axis 12 by the core engine 16. It is conventionally known that rotating rotor blades of a gas turbine engine fan or compressor generate noise which extends either upstream or downstream therefrom, or both, which noise may be objectionably loud, especially during takeoff or approach operation of the engine 10. In accordance with the present invention, an improved apparatus is disclosed for reducing rotor blade generated noise from the engine 10 such as that from the fan blades 14.

The noises generated and caused by the fan blades 14 specifically addressed by the present invention are conventionally known as discrete frequency spinning mode noises, or tones, which include rotating pressure fields and/or wakes caused by the rotating fan blades 14 by themselves, and additionally by their interaction with the downstream adjacent OGVs 30. The spinning mode noises conventionally include both fundamental and harmonics thereof.

More specifically, spinning mode noise is generated by the fan blades 14 at the fundamental fan blade passing frequency BPF and the higher harmonics thereof. It is conventionally known during the design of a gas turbine engine to initially select a number B representing the total number of fan blades 14 and then select a number V representing the total number of OGVs 30 based on conventional criteria for reducing the spinning mode noises. Given the number B of fan blades 14, the blade passing frequency BPF in revolutions per minute is simply the product of the number of blades B and the rotational speed N of the fan blades 14 about the centerline axis 12, i.e. B×N. The harmonics thereof are represented by an integer harmonic number n=1, 2, 3 . . . , wherein the first harmonic (n=1) is the same as the fundamental blade passing frequency BPF, with the second harmonic (n=2) having twice the frequency thereof and so on for the higher order harmonics.

The principles upon which this invention are based are those governing the propagation and radiation of discrete tone noise, such as the spinning mode noises, in an annular duct such as the fan duct 24. For the numbers V of OGVs 30 and B of fan blades 14, the discrete tone noise of interest includes the superposition of pressure patterns represented by a spinning mode number m, i.e.

$$m = nB - kV \qquad (1)$$

wherein n is the blade passing frequency harmonic integer number which is equal to 1, 2, 3 . . . , and k is an index number that may take on all positive and negative integers, e.g. plus or minus 1, 2, 3, . . .

As shown in FIG. 1, the fan blades 14 also include a radially outer tip 14a which is disposed at a tip radius $R_t$ in feet from the centerline axis 12, which upon rotation at the rotational speed N has a tip speed mach number $M_t$ represented as follows:

$$M_t = 2\pi N R_t / 60 A_o \qquad (2)$$

where $A_o$ is a constant representing the conventionally determined sonic velocity, in feet per second, of the air 26 within the fan duct 24.

The flow of the air 26 through the duct 24 from the inlet 24b to the outlet 24c has a speed at given engine operating conditions of interest such as at takeoff or approach power settings of the engine 10 which may be represented by its mach number $M_a$ as follows:

$$M_a = V_a / A_o \qquad (3)$$

wherein $V_a$ is the given velocity, in feet per second, of the air 26 flowing therethrough.

According to conventional practice, the number V of OGVs 30 is selected relative to a predetermined number B of the fan blades 14 for obtaining conventionally known cutoff of the spinning mode noise generated by the fan blades 14 at the operating condition of interest. Cut-off is a conventionally known concept which represents a point below which a discrete spinning mode tone, or noise at a specific frequency, will decay, and at or above which the spinning mode tone will propagate through the length of the duct 24 and radiate outwardly from the inlet 24b or the outlet 24c, or both into the free air, which during takeoff or landing of the aircraft may be unacceptably loud to listeners in the community. Since the spinning mode noise occurs at several harmonics, a respective cutoff point is associated with each of the harmonics. It is conventionally known, for example, that in order to obtain cut-off of spinning mode tone harmonics up to the harmonic n, the number of stator vanes V should be selected to be equal to or greater than twice the number of rotor blades B times the harmonic number n. For the fundamental blade passing frequency BPF, V would be selected to equal 2B. For obtaining cut-off through the second harmonic, the number of vanes V would be equal to or greater than 4B and so on. However, for modern high bypass turbofan engines, the required number of stator vanes V, i.e. 4B, is an impractically large number of vanes and would not ordinarily be used in an engine design.

One of the principles employed in developing the present invention is that cut-off as represented by a cut-off parameter or ratio K uniquely defines the propagation and radiation characteristic of each spinning mode tone. The cut-off ratio K may alternatively be considered to represent the ratio of a sound source frequency to the frequency that just begins to propagate in the duct. For particular spinning modes m with a cut-off ratio K less than 1.0, the spinning mode tone will decay, and for values equal to or greater than 1.0, the spinning mode tone will propagate through the duct 24 and radiate outwardly therefrom. The greater the value of K, the more aligned with the centerline 12 the sound propagation direction becomes, and the smaller the residence time of the sound wave inside the nacelle 44 becomes before radiating from the nacelle 44.

The cut-off ratio K may have various representations, with the following representation being used herein:

$$K_{|m|} = \frac{nB\,(M_t)}{(1-M_a^2)^{1/2}} \quad (4)$$

Equation (4) shows that the cut-off ratio K is proportional to the blade passing frequency harmonic number n, the blade number B which is predetermined based on conventional design practice, the absolute value of the spinning mode number m, and the speed of the fan blade tips 14a relative to the speed of the flow of the air 26 through the duct 24 which is represented, for example, by the expression $M_t/(1-M_a^2)^{1/2}$.

Figure 3:
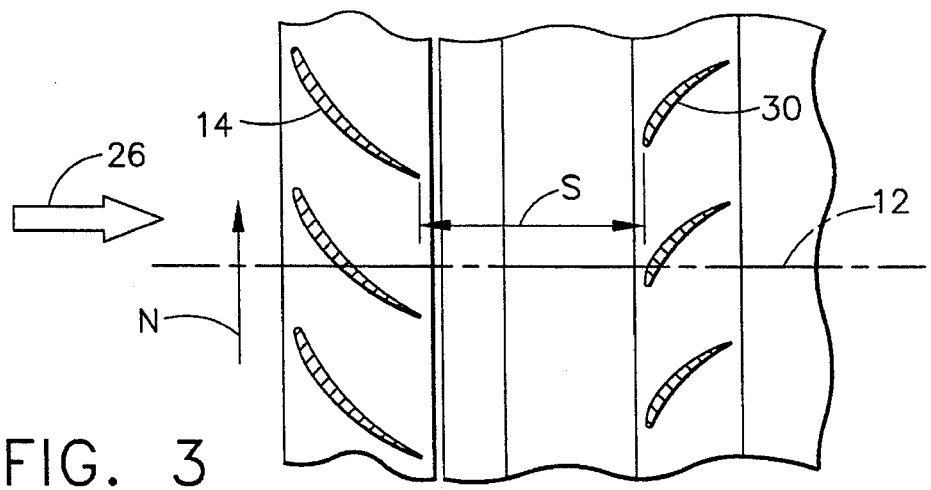
FIG. 3 is a radial sectional view of a portion of the fan assembly illustrated in FIG. 2 taken along line 3—3.

In accordance with the present invention, the vane-to-blade ratio is exactly equal to 1.0 with there being an exact equal number of vanes V and number of blades B, i.e. V=B, as shown in FIG. 3. In this way, the BPF noise tone is always cut-on and therefore always propagates. However, the spinning mode number m for the fundamental or primary noise tone is zero. For V=B, equation (1) reduces to the following:

$$m = B(n-k) \quad (5)$$

For the fundamental noise tone wherein n=1 and k=+1, the spinning mode number m is equal to zero. Accordingly, the spinning mode number m is always zero or an integer multiple of the number of blades B. All non-zero modes, i.e. m≠0, can be usually attenuated by conventional passive acoustic liners tuned to the specific spinning mode number equal to the blade number B and integer multiples thereof.

However, for zero spinning mode numbers, i.e. m=0, equation (4) results in a cut-off ratio K substantially greater than 1.0, and in particular infinity. A zero spinning mode number m indicates a non-rotating or non-spinning pressure distribution, with the noise tone associated therewith traveling in an axial direction in a plane-wave mode pattern.

By intentionally configuring the gas turbine engine 10 illustrated in FIGS. 1–3 with equal numbers of fan blades 14 and outlet guide vanes 30, the fundamental noise tone, i.e. n=1, k=1, m=0, is a plane-wave mode which can be attenuated in accordance with the present invention by a suitable active anti-noise means specifically tuned therefor. The higher harmonic noise tones having less energy are then readily attenuated using conventional passive acoustic liners. Accordingly, the use of both active and passive means collectively attenuate the various noise tones from the fan duct 24 in an improved system.

More specifically, and referring to FIG. 2 for example, a conventional first or inlet passive acoustic liner 32a is disposed immediately axially forwardly of or upstream of the fan blades 14 for a predetermined portion of the outer duct wall 24a for attenuating at least one of the higher order, non-zero spinning mode noise tones generated by the fan blades 14, with the noise tones or sound pressure waves being indicated by the numeral 34. The first passive acoustic liner 32a may take any conventional form and may typically include a porous or perforated facesheet which forms a portion of the duct outer wall 24a and through which the pressure waves 34 may enter into one or more layers of honeycomb chambers, with the relative sizes of these components being selected for tuning the liner for attenuating one or more harmonics of spinning mode noise tones.

The active attenuating means for the fundamental noise tone is illustrated schematically in FIG. 2 and preferably includes a plurality of circumferentially spaced apart inlet or first sound source actuators or transmitters 36a disposed in sound or pressure communication with the fan duct 24. The sound transmitters 36a may take any conventional form such as electromagnetic sound drivers or speakers, or piezoelectric ceramic drivers, or fluidic drivers. At least one, and preferably a plurality of, first or inlet noise sensors 38a are disposed in sound communication with the fan duct 24 for sensing or measuring magnitude and phase of the fundamental noise tone, i.e. n=1, k=1. The noise sensors 38a may take any conventional form for measuring dynamic pressure level of the fundamental noise tone and may also be referred to as microphones.

A conventional first controller 40a in the exemplary form of a programmable digital computer is operatively joined to the inlet noise sensors 38a through suitable electrical lines and is effective for generating an anti-noise signal opposite in phase to the fundamental noise tone. A conventional first amplifier 42a is operatively joined to the first controller 40a by a suitable electrical line for amplifying power of the anti-noise signal received from the first controller 40a to preferably match the magnitude of, but 180° out of phase with, the measured fundamental noise tone. At least one inlet or first acoustic driver 44a is operatively joined to the first amplifier 42a and the first sound transmitters 36a by suitable electrical lines for driving all the first sound transmitters 36a in phase based on the amplified anti-noise signal for attenuating the fundamental noise tone propagating upstream in the fan duct 24.

In the exemplary embodiment illustrated in FIGS. 1 and 2, the first sound transmitters 36a are disposed in a single ring array with preferably three to ten equiangularly spaced apart ones thereof, with the actual number thereof being determined by the specific amount of power required therefrom to effectively cancel or attenuate the fundamental non-spinning noise tone generated by the blades 14. A suitable number of the first noise sensors 38a are similarly disposed in a single ring array and equiangularly spaced apart from each other for providing redundancy of operation and for collectively providing an average value of the fundamental noise tone to the first controller 40a as a single input thereto. As shown in FIG. 2, conventional means 46 in the form of a suitable circuit or software receives the several signals from the several first noise sensors 38a and provides an average value thereof to the first controller 40a operatively joined thereto. This allows the first controller 40a to be a relatively simple single input-single output (SISO) controller known to those skilled in the art.

In operation, the first acoustic liner 32a is effective for attenuating one or more of the higher order, harmonic spinning mode noise tones generated by the blades 14, with the active anti-noise system being effective for attenuating the fundamental non-spinning noise tone. This substantially reduces the complexity of the active anti-noise system since it does not have to detect any spinning mode noise tones, and therefore does not have to correspondingly phase sound transmitters in-turn to develop attenuating spinning mode pressure fields. In contrast, the simple active anti-noise system illustrated in FIG. 2 need only provide an anti-noise pressure field from the several first sound transmitters 36a all at the same phase, which is opposite to that of the fundamental noise tone, and with a collective power output substantially equal in magnitude thereto for providing effective attenuation thereof. Since the first sound transmitters 36a need only introduce plane waves, i.e., non-spinning mode sound at the fundamental BPF, a single ring array of the several first sound transmitters 36a is only required. The first noise sensors 38a need only provide a single pressure signal to the first controller 40a which is used as an error signal for controlling the first sound transmitters 36a in conventional feedback or feedforward control operation as desired.

In this way, the engine 10 may be specifically designed with an equal number of fan blades 14 and outlet guide vanes 30 to take advantage of the conditions where active noise control works best and requires the least complexity, which in the exemplary embodiment illustrated is for a relatively low, fundamental frequency and for non-spinning plane wave modes. Correspondingly, the higher harmonic spinning mode noise tones are effectively attenuated using conventional passive acoustic liners.

Since the number of vanes V is equal to the number of blades B, the vane number is small enough so that the outlet guide vanes 30 themselves may be used as structural supporting struts for the nacelle 22. This eliminates the need for a separate fan frame supporting the nacelle 22 which is typically found in conventional high bypass turbofan engines. This further allows a larger axial spacing S as illustrated in FIGS. 2 and 3 between the fan blades 14 and the vanes 30 which assists in further reducing noise being generated by the interaction therebetween.

Referring again to FIG. 2, the first noise sensors 38a are disposed at the forward end of the fan duct 24 adjacent to the duct inlet 24b in the outer duct wall 24a. The first sound transmitters 36a and the first passive acoustic liner 32a are disposed axially between the first noise sensors 38a and the fan blades 14, with the first sound transmitters 36a being disposed downstream of the first noise sensors 38a, with the first acoustic liner 32a in turn being disposed axially downstream therefrom and between the first sound transmitters 36a and the fan blades 14. The first sound transmitters 36a are also preferably disposed in the outer duct wall 24a for providing a smooth, coextensive surface therewith.

This axial arrangement of the first acoustic liner 32a, the first sound transmitters 36a, and the first noise sensors 38a at the duct inlet 24b relative to the downstream flow of the air 26 therethrough provides several advantages. Firstly, the first acoustic liner 32a is allowed to attenuate noise propagating upstream in the fan duct 24 from the fan blades 14 before leaving the duct inlet 24b, and secondly, before the first sound transmitters 36a are acquired to attenuate the fundamental noise tone. This also increases the signal-to-noise level of the first noise sensors 38a since some component of the noise tones has been attenuated prior to reaching the first noise sensors 38a. And, by locating the first noise sensors 38a at the duct inlet 24b, they can record the effectiveness of the anti-noise effect of the first sound transmitters 36a which attenuate the fundamental noise tone, and feed back to the first controller 40a a corresponding error signal thereof.

Referring again to FIG. 1, a preferably separate and independent active anti-noise system is also provided for attenuating noise from the fan duct outlet 24c. In this embodiment, one or more second or outlet noise sensors 38b are disposed adjacent to the duct outlet 24c, and a plurality of outlet or second sound transmitters 36b are disposed upstream from the second noise sensors 38b. The second sound transmitters and noise sensors 36b, 38b may be identical to the first sound transmitters and noise sensors 36a, 38a and also disposed in single ring arrays thereof. A conventional outlet or second passive acoustic liner 32b is disposed axially at least in part between the second sound transmitters 36b and the outlet guide vanes 30. A second controller 40b, second amplifier 42b and second acoustic driver 44b are operatively joined to the respective second sound transmitters 36b and noise sensors 38b for attenuating the fundamental noise tone propagating downstream to the duct outlet 24c. The second controller 40b, amplifier 42b, and acoustic driver 44b are preferably identical to the first controller 40a, amplifier 42a, and acoustic driver 44a, respectively, for operating identically thereto but independently thereof, in this way, noise may be independently attenuated from the duct inlet 24b and the duct outlet 24c during aircraft takeoff or landing as required.

In the exemplary embodiment illustrated in FIG. 1, the inner duct wall 24d also includes a conventional third passive acoustic liner 32c therearound which extends downstream from the vanes 30 to adjacent the duct outlet 24c. The second noise sensors 38b are preferably disposed in the inner duct wall 24d at the duct outlet 24c, whereas the second sound transmitters 36b are disposed in the outer duct wall 24a. In this way, these components do not interfere with conventional thrust reversers (not shown) which are typically located at the downstream end of the nacelle 22. Furthermore, the second sound transmitters 36b are preferably spaced axially upstream from the duct outlet 24c where space permits without interference with these thrust reversers. In this embodiment, the second acoustic liner 32b includes an additional portion disposed axially between the second sound transmitters 36b and the duct outlet 24c as shown in FIG. 1. In alternate embodiments, the second sound transmitters 36b and noise sensors 38b may be disposed as desired in one or both of the outer and inner duct walls 24a, 24d.

Accordingly, the engine 10 is configured as above described for having equal numbers of fan blades 14 and outlet guide vanes 30 for specifically producing a fundamental noise tone at the blade passing frequency which is a non-spinning plane wave mode noise tone but is always cut-on and therefore propagates axially through the fan duct 24. The active anti-noise system includes a relatively simple single-input-single-output controller 40a,b which provides a single output anti-noise signal for driving the sound transmitters 36a,b at a suitable magnitude but with an opposite phase to the fundamental noise tone measured by the noise sensors 38a,b. Anti-noise is generated by the sound transmitters 36a,b in simple opposite phase to the sensed fundamental noise tone for providing effective attenuation thereof. And, active anti-noise can be generated for higher order harmonics of the non-spinning modes as well as for the fundamental mode thereof. The active anti-noise system and cooperating passive acoustic liners 32a–c are complementary to each other for collectively attenuating both spinning and non-spinning mode noise tones generated by the fan blades 14 during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine fan assembly comprising:

a number of circumferentially spaced apart rotor blades;

a number of circumferentially spaced apart stator vanes spaced axially from said blades;

an annular duct surrounding said blades and said vanes, and having an inlet for receiving air and an outlet for discharging at least a portion of said air upon compression by said blades;

said blade number being equal to said vane number so that a fundamental blade passing frequency noise tone is generated in said fan duct with a cut-off ratio greater than 1.0 and a spinning mode number of zero, and harmonic blade passing frequency noise tones are generated in said fan duct with non-zero spinning mode numbers; and said fan duct further includes a passive acoustic liner tuned for attenuating at least one of said harmonic noise tones, and means for actively attenuating said fundamental noise tone.

2. A fan assembly according to claim 1 wherein said active attenuating means comprises:

a plurality of circumferentially spaced apart sound transmitters disposed in sound communication with said fan duct;

a noise sensor disposed in sound communication with said fan duct for sensing magnitude and phase of said fundamental noise tone;

a controller operatively joined to said noise sensor and effective for generating an anti-noise signal opposite in phase to said fundamental noise tone;

an amplifier for amplifying power of said anti-noise signal; and an acoustic driver for driving all said sound transmitters in phase based on said amplified anti-noise signal for attenuating said fundamental noise tone.

3. A fan assembly according to claim 2 wherein:

said sound transmitters are disposed in a single ring array;

a plurality of said noise sensors are disposed in a single ring array for providing an average value of said fundamental noise tone to said controller as a single input thereto; and said controller is effective for providing a single output to said plurality of sound transmitters.

4. A fan assembly according to claim 2 wherein said noise sensor is disposed at an end of said fan duct, and said sound transmitters and passive acoustic liner are disposed between said noise sensor and said rotor blades.

5. A fan assembly according to claim 4 wherein:

said rotor blades are fan blades, and said stator vanes are outlet guide vanes disposed downstream from said fan blades;

said duct is a fan duct disposed inside a nacelle, and includes a radially outer duct wall surrounding said blades and vanes, and having a duct inlet at a forward, upstream flow end thereof, and a duct outlet at an aft, downstream flow end thereof; and said noise sensor is disposed adjacent to at least one of said duct inlet and outlet.

6. A fan assembly according to claim 5 wherein:

said noise sensor is disposed adjacent to said duct inlet;

said sound transmitters are disposed downstream from said noise sensor; and said passive acoustic liner is disposed between said sound transmitters and said fan blades.

7. A fan assembly according to claim 5 wherein:

said noise sensor is disposed adjacent to said duct outlet;

said sound transmitters are disposed upstream from said noise sensor; and said passive acoustic liner is disposed at least in part between said sound transmitters and said outlet guide vanes.

8. A fan assembly according to claim 5 further comprising:

an inlet one of said noise sensors disposed adjacent to said duct inlet in said outer duct wall;

inlet ones of said sound transmitters disposed downstream from said inlet noise sensor in said outer duct wall;

an inlet one of said passive acoustic liners disposed between said inlet sound transmitters and said fan blades in said outer duct wall;

an outlet one of said noise sensors disposed adjacent to said duct outlet;

outlet ones of said sound transmitters disposed upstream from said outlet noise sensor;

an outlet one of said passive acoustic liners disposed between said outlet sound transmitters and said outlet guide vanes; and separate ones of said controller, amplifier and acoustic driver for independently attenuating said fundamental noise tone from said duct inlet and outlet.

9. A fan assembly according to claim 8 wherein:

said fan duct further includes a radially inner wall extending from adjacent said blades to said duct outlet;

said inner duct wall includes a passive acoustic liner therearound; said outlet noise sensor is disposed in said inner duct wall; and said outlet sound transmitters are disposed in said outer duct wall.

10. A fan assembly according to claim 9 wherein said outlet sound transmitters are spaced upstream from said duct outlet, and further including an additional passive acoustic liner disposed between said outlet sound transmitters and said duct outlet.

* * * * *